United States Patent [19]

Shabrang et al.

[11] Patent Number: 5,684,619
[45] Date of Patent: Nov. 4, 1997

[54] RUTHENIUM OXIDE COUNTERELECTRODE FOR ELECTROCHROMIC DEVICES

[75] Inventors: Mani Shabrang; Susan J. Babinec; Richard D. Varjian, all of Midland, Mich.

[73] Assignee: The Dow Chemical Company, Midland, Mich.

[21] Appl. No.: 693,427

[22] Filed: Aug. 7, 1996

Related U.S. Application Data

[63] Continuation-in-part of Ser. No. 338,915, Nov. 14, 1994, abandoned, which is a continuation-in-part of Ser. No. 146,753, Nov. 2, 1993, abandoned.
[51] Int. Cl.[6] ................................................ G02F 1/153
[52] U.S. Cl. ............................... 359/273; 359/274
[58] Field of Search ................................ 359/265, 273, 359/274

[56] References Cited

U.S. PATENT DOCUMENTS

| 4,573,768 | 3/1986 | Polak et al. | 359/270 |
| 5,457,564 | 10/1995 | Leventis et al. | 359/271 |

*Primary Examiner*—Georgia Y. Epps
*Assistant Examiner*—Thomas Robbins
*Attorney, Agent, or Firm*—Timothy S. Stevens

[57] ABSTRACT

An improved electrochromic device of the type having an electrochromic electrode in contact with an ion conductor, the ion conductor in turn being in contact with a layer of gold. The improvement of the instant invention is to interpose a layer of ruthenium oxide between the ion conductor and the layer of gold. The layer of ruthenium oxide is not an electrochromic material.

10 Claims, 1 Drawing Sheet

5,684,619

RUTHENIUM OXIDE COUNTERELECTRODE FOR ELECTROCHROMIC DEVICES

This application is a continuation-in-part of continuation-in-part application 08/338,915 filed Nov. 14, 1994, now abandoned, which is a continuation-in-part of application Ser. No. 08/146,753 filed Nov. 2, 1993, now abandoned.

BACKGROUND

Electrochromic devices reflect, absorb or transmit a controllable amount of light in response to an input of electric current to the device. Electrochromic devices have a wide range of applications, e.g., a variably tintable window for an automobile or building. Many electrochromic devices include an electrochromic electrode, an ion conductor and a counterelectrode.

A preferred electrochromic device of U.S. Pat. No. 5,124,080 to Shabrang and Babinec comprised a layered structure as follows: (1) a panel of glass; (2) a layer of indium tin oxide upon the panel of glass; (3) a layer of tungsten oxide upon the layer of indium tin oxide; (4) a layer of perfluorosulfonic acid polymer upon the layer of tungsten oxide; and (5) a layer of gold upon the layer of perfluorosulfonic acid polymer. The layer of tungsten oxide and the layer of indium tin oxide form the electrochromic electrode. The layer of perfluorosulfonic acid polymer is the ion conductor. The layer of gold is an electronic conductor and the counterelectrode.

The electrochromic device of U.S. Pat. No. 5,124,080, discussed above, performed well, especially when operated in the humidified inert gas environment as disclosed in U.S. Pat. No. 5,136,419 to Shabrang. For example, such electrochromic devices have operated for tens of thousands of cycles. However, when the size of such devices was increased from square inch dimensions to square foot dimensions, then an unforeseen problem arose with the counterelectrode after the device was operated for less than one thousand cycles. The problem was the apparent failure of the counterelectrode.

SUMMARY OF THE INVENTION

The primary benefit of the instant invention is a solution to the above-mentioned problem with the counterelectrode. The instant invention is an improvement to the above-mentioned type of device, i.e., a device that comprises an electrochromic electrode, an ion conductor, and a counterelectrode comprising a layer of an electronic conductor. The improvement of the instant invention is the addition of a layer of ruthenium oxide. The layer of ruthenium oxide is positioned between the layer of an electronic conductor and the ion conductor. The layer of ruthenium oxide is not an electrochromic material.

DETAILED DESCRIPTION OF THE INVENTION

Figure 1:
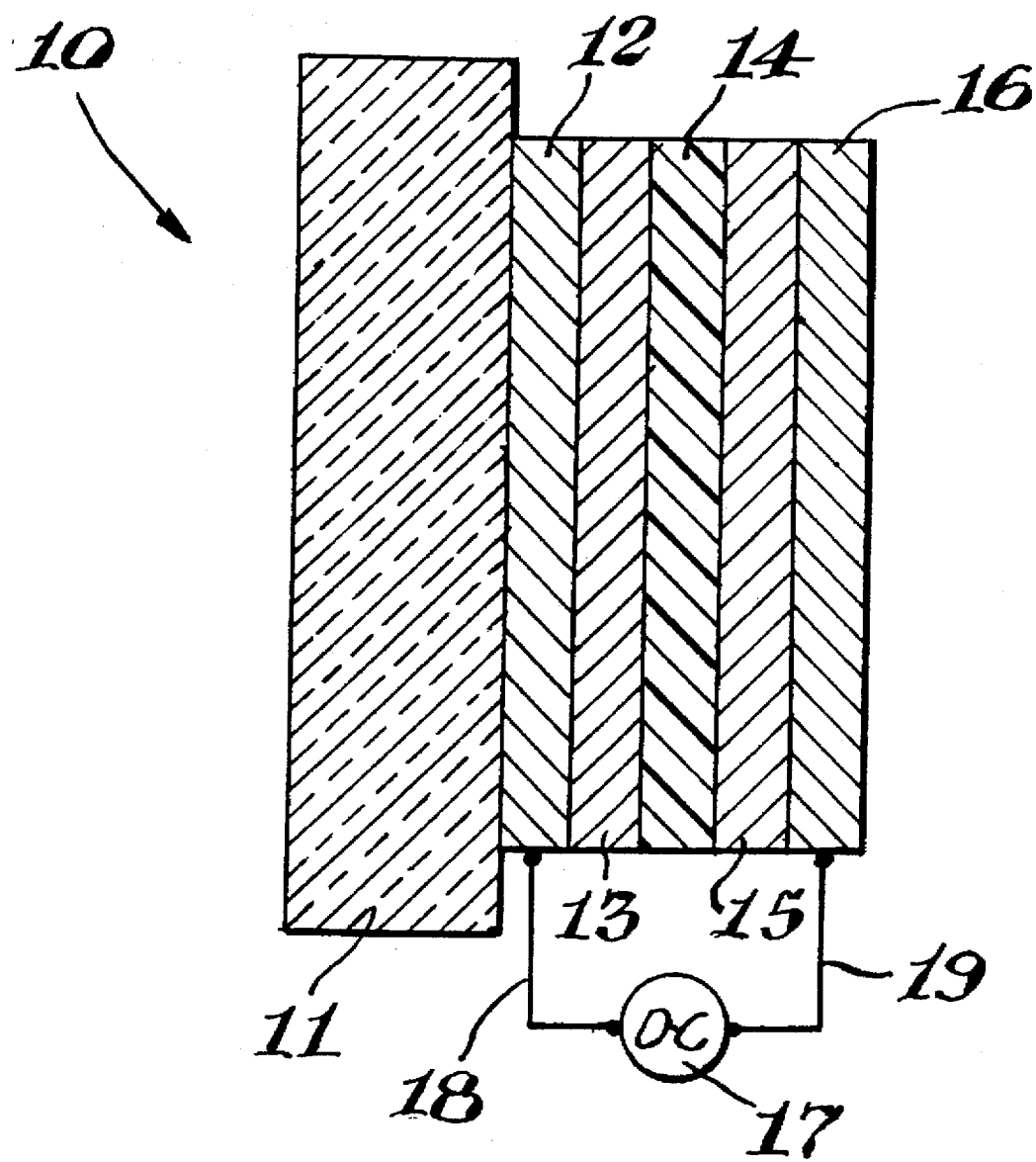
FIG. 1 is a cross sectional side view of a highly preferred improved electrochromic device according to the instant invention.

Referring now to FIG. 1, therein is shown a cross sectional side view of a highly preferred improved electrochromic device 10 according to the instant invention. The device 10 includes a panel of glass 11 having the following layers thereon: an electronically conductive 2,000 Angstrom thick transparent layer of indium tin oxide 12; a 6,000 Angstrom thick transparent layer of tungsten oxide 13; a 5 micrometer thick transparent layer of perfluorosulfonic acid polymer 14; a 400 Angstrom thick transparent layer of ruthenium oxide 15; and a 150 Angstrom thick electronically conductive transparent layer of gold 16. A 200 Angstrom thick layer of titanium dioxide, not shown, can be applied to the layer of gold 16 as an antireflective and protective coating.

The layer of indium tin oxide 12 and the layer of tungsten oxide 13 form a cathodic electrochromic electrode as is well known in the art, e.g., U.S. Pat. No. 4,193,670 to Giglia et al. The layer of perfluorosulfonic acid polymer 14 is an ion conductor as is well known in the art, e.g., U.S. Pat. No. 5,124,080 to Shabrang and Babinec. The layer of ruthenium oxide comprises the improved counterelectrode of the instant invention.

One terminal of a source of direct current electricity 17 is connected to the layer of indium tin oxide by a first wire 18. The other terminal of the source of direct current electricity 17 is connected to the gold layer 16 by a second wire 19. The device 10 is cycled to its relatively clear or to its relatively colored state depending on the polarity of the source of direct current electricity 17.

The electrochromic device 10 can be made according to the following procedure. Examples 1 and 2 of U.S. Pat. No. 5,136,419 are followed up to, but not including, the point where the gold layer is deposited. Then the ruthenium oxide layer 15 is deposited upon the perfluorosulfonic acid polymer layer by a sputtering technique using an etched ruthenium metal target in a reduced pressure oxygen atmosphere. Sputtering is a well known technique for forming thin films, see for example, Wasa et al., *Handbook of Sputter Deposition Technology*, 1992, ISBN 0-8155-1280-5. Then the gold layer 16 is deposited on the ruthenium oxide layer 15 by a sputtering technique using a gold metal target in a reduced pressure argon atmosphere, i.e., using the same procedure as was used in the above-mentioned U.S. Pat. No. 5,136,419 to put a gold layer upon a layer of perfluorosulfonic acid polymer. The gold layer 16 is about 150 angstroms thick.

A highly preferred sputtering condition for depositing the ruthenium oxide layer 15 is to use a target of ruthenium, a base pressure of less that 0.05 micrometers of mercury, an oxygen pressure of 10 micrometers of mercury, a sputtering gun power of 50 watts, and a target to substrate distance of about 12 centimeters for a 3 by 3 centimeter test device. Such a sputtering condition should result in a ruthenium oxide deposition rate of about 4 angstroms per second. A US II sputtering gun (Campbell, Calif.) can be used in a standard vacuum chamber. The ruthenium target can be obtained from the PureTech Company, Carmel, N.Y. Preferably, the ruthenium target is argon etched for thirty seconds prior to the sputtering operation.

Another method of direct current sputtering uses, surprisingly, a target of compressed pellet of ruthenium oxide. The pellet can be two inches in diameter and one eighth inch thick. Preferably, the pellet contains a binder so that the pellet is less fragile, e.g., two percent TEFLON paste as a binder. A base pressure of less that 0.02 micrometers of mercury, an argon pressure of 10 micrometers of mercury, a sputtering gun power of 50 watts, and a target to substrate distance of about 12 centimeters so a 3 by 3 centimeter test device can be used during the sputtering operation.

Preferably, the thickness of the ruthenium oxide layer 15 is more than about 100 angstroms. More preferably, the thickness of the ruthenium oxide layer 15 is more than about 200 angstroms. Most preferably, the thickness of the ruthenium oxide layer 15 is about 400 angstroms. On the other hand, preferably, the thickness of the ruthenium oxide layer 15 is less than about 1,000 angstroms. More preferably, the thickness of the ruthenium oxide layer 15 is less than about 600 angstroms Most preferably, the ruthenium oxide layer is perfectly level and even. However, when the ruthenium oxide layer is not perfectly level and even, then the thickness discussed above is the average thickness thereof.

The preferred means of forming the ruthenium oxide layer is the sputtering technique described above using a target comprising ruthenium metal. However, forming the ruthenium oxide layer by a sputtering technique is not critical in the instant invention. The ruthenium oxide layer can be formed by any other suitable technique as long as the ruthenium oxide is not an electrochromic material. For example, a layer of gold can be sputtered onto a pane of glass and then a layer of ruthenium can be sputtered onto the layer of gold. Then, the ruthenium layer is oxidized by the well known technique of repeated electrochemical oxidation and reduction in dilute sulfuric acid. Alternatively, a layer of ruthenium metal alone can be partly so oxidized so that a layer of ruthenium oxide is formed on an underlying layer of ruthenium metal. In this case of course, the electronically conducting layer is a layer of ruthenium metal.

X-ray Photoelectron Spectroscopy analysis of the preferred sputtered ruthenium oxide layers of the instant invention consistently shows a top layer, about fifty angstroms thick, composed of about $RuO_3$ for a sputtering gun power of fifty or two hundred watts. However, the underlying layer, according to Analytical Transmission Electron Microscopy, is composed of about $RuO_2$ when the sputtering gun power is fifty watts but is composed of about $RuO_{2.5}$ when the sputtering gun power is two hundred watts.

A highly preferred sputtering condition for depositing the gold layer 16 is to use a target of gold, a base pressure of less than 0.02 micrometers of mercury, an argon pressure of 10 micrometers of mercury, a sputtering gun power of 50 watts, and a target to substrate distance of about 12 centimeters for a 3 by 3 centimeter test device. A US II sputtering gun (Campbell, Calif.) can be used in a standard vacuum chamber. The gold target can be obtained from the PureTech Company, Carmel, N.Y. Preferably, the gold target is argon etched for thirty seconds prior to the sputtering operation.

The term "electronic contact" is used herein in its conventional meaning, e.g., the transference of electronic current from one material to another material. In FIG. 1 the ruthenium oxide layer 15 is in direct contact with the electronically conducting gold layer 16 so that there can be direct electronic contact between the ruthenium oxide layer 15 and the gold layer 16. However, it should be understood that there does not have to be direct physical contact between the ruthenium oxide layer and the electronically conducting layer as long as there is electronic conduction between the ruthenium oxide layer and the electronically conducting layer. For example, a layer of an electronically conducting material, such as a metal or certain metal oxides, can be positioned between the ruthenium oxide layer and the electronically conducting layer as long as electronic conduction between the ruthenium oxide layer 15 and the electronically conducting layer is maintained.

The term "ionic contact" is also used herein in its conventional meaning, e.g., the transference of ions such as hydrogen ions ($H^+$) from one material to another material. In FIG. 1, the ruthenium oxide layer 15 is in direct contact with the ion conducting perfluorosulfonic acid polymer layer 14. It is theorized, without being bound thereby, that when the device 10 is colored, hydrogen ions are conducted from the ruthenium oxide layer 15 into the perfluorosulfonic acid polymer layer 14. These hydrogen ions are then conducted, it is theorized, without being bound thereby, through the perfluorosulfonic acid polymer layer 14 into the tungsten oxide layer 13 so that the tungsten oxide is converted into an intensely colored bronze. However, it should be understood that there does not have to be direct physical contact between the ruthenium oxide layer and the ionic conductor as long as there is ionic conduction between the ruthenium oxide layer and the ionic conductor. For example, a layer of an ionically conducting material, such as silicon dioxide, can be positioned between the ruthenium oxide layer and the ion conductor. It should also be understood that the instant invention is not limited or defined by the above-mentioned theory. For example, the hydrogen ions can be at least partly replaced with lithium ions or sodium ions.

The term "ion conductor" is used herein in its conventional meaning, e.g., a solid or liquid material through which ionic conduction occurs. Preferably, in the instant invention the ion conductor is a relatively poor electronic conductor, e.g., the perfluorosulfonic acid polymer of U.S. Pat. No. 5,136,419, used in the hydrogen ion form or at least partially in a salt form such as the sodium ion form or especially the lithium ion form. Other ion conductors that have been used in prior art electrochromic devices and which can be used in the instant invention include, without limitation, poly 2-acrylamido-2-methylpropane sulfonic acid or salt, sulfonated polystyrene acid or salt, NAFION brand perfluorosulfonic acid polymer from DuPont (acid or salt), polyethylene oxide, p-toluene sulfonic acid or salt, sodium beta alumina, silicon dioxide, tantalum oxide and zirconium oxide as discussed, for example, by Jean-Paul Randin, "Ion Containing Polymers as Semi-Solid Electrolytes in Tungsten Oxide Based Electrochromic Devices", *J. Electrochem. Soc.*, 129(6), 1215–20 (1982) and by Carl M. Lampert, "Electrochromic Materials and Devices for Energy Efficient Windows", *Solar Energy Materials*(1984).

The term "cathodic electrochromic electrode" is used herein in its conventional meaning, e.g., an electrode that transmits or reflects a noticeably decreased amount of light (an absorbency increase of more than 0.2 Absorbency Units for visible light) when such electrode is made sufficiently negative relative to the counterelectrode. In the prior art of electrochromic devices one of the most used cathodic electrochromic electrodes is a layer of tungsten oxide on a layer of indium tin oxide. However, the use of tungsten oxide is not critical in the instant invention and other cathodic electrochromic materials can be used such as, without limitation, lithium tungsten oxide, niobium oxide, vanadium oxide, titanium dioxide, molybdenum oxide, heteropolytungstates, etc., see Carl M. Lampert, "Electrochromic Materials and Devices for Energy Efficient Windows", *Solar Energy Materials*(1984) and U.S. Pat. No. 5,142,406 to Lampert et al., Column 3, line 49, to column 5, line 4.

Such electrochromic materials are often associated with an electrically conducting layer or current collector of indium tin oxide to complete the cathodic electrochromic electrode. However, other current collectors can be used in place of the indium tin oxide, such as a layer of gold or other means, such as described in U.S. Pat. No. 5,142,406 to Lamperr et al., Column 7, line 48, to column 8, line 3.

The term "counterelectrode" is used herein in its conventional meaning, e.g., an electrode which when paired with an electrochromic electrode via an ion conductor forms an electrochromic device. The layer of ruthenium oxide must not be an electrochromic material, i.e., the counterelectrode must not be an electrochromic electrode, i.e., the absorbency of the counterelectrode must not change by more than 0.2 Absorbency Units for visible light when the device is cycled from its colored state to its bleached state. The layer of an electronic conductor of the counterelectrode of the instant invention can be a layer of a metal such as a layer of gold or ruthenium or it can be a layer of an nonmetallic electronically conducting material such as indium tin oxide.

The device 10 of FIG. 1 is only one example of the instant invention. For example, a laminated glass device according to the instant invention can be made as follows. Examples 1 and 2 of U.S. Pat. No. 5,136,419 are followed up to, but not including, the point where the gold layer is deposited, i.e., including the formation of a layer of perfluorosulfonic acid polymer. A layer of ruthenium oxide is deposited upon the indium tin oxide layer of a separate indium tin oxide coated panel of glass using the sputtering technique described above. The perfluorosulfonic acid polymer layer and the ruthenium oxide layer are wetted with the perfluorosulfonic acid polymer dispersion of Example 1 of U.S. Pat. No. 5,136,419 and then the two panes of glass are pressed together so that the perfluorosulfonic acid polymer dispersion bonds the perfluorosulfonic acid polymer layer to the ruthenium oxide layer to produce a laminated device according to the instant invention.

Thus, a critical limitation of the instant invention is that a layer of ruthenium oxide be positioned between the layer of an electronic conductor and the ion conductor, the layer of ruthenium oxide being in direct or indirect ionic contact with the ion conductor, the layer of ruthenium oxide also being in direct or indirect electronic contact with the layer of electronic conductor.

Obviously, the layer of ruthenium oxide need not be nor can it practically be absolutely pure ruthenium oxide. Other materials can be present either as mixtures or compounds (amorphous or crystalline). However, the ruthenium oxide content of the ruthenium oxide layer, on a mole percent basis, must be greater than fifty percent and the layer of ruthenium oxide must continue to protect the counterelectrode from failure when the device is repeatedly cycled.

Examples of other materials that can be present essentially alone or in combination include, without limitation, the oxides of tin, indium, zinc, tantalum, titanium, silicon, tungsten, molybdenum, antimony, niobium, aluminum, hafnium, yttrium, nickel, cobalt, iron, chromium, vanadium, rhodium, palladium, iridium, platinum, gold and cadmium. Layers containing multiple metal oxides can be formed by any conventional process for forming layers containing multiple metal oxides such as sputtering in an oxygen atmosphere from a target of multiple metals or a multitude of targets each of essentially pure metals or metal alloys.

Materials such as the oxides of lithium, sodium, potassium, rubidium, cesium, beryllium, magnesium, calcium, strontium and barium can be present alone or in combination with the other materials listed in the preceeding paragraph provided the rethenium oxide content of the ruthenium oxide layer, on a mole percent basis, is greater than fifty percent and the layer of rethenium oxide continues to protect the counterelectrode from failure when the device is repeatedly cycled. Such ruthenium oxide layers can be formed by any conventional process. A preferred process for forming such layers is to mix such oxides with ruthenium oxide powder and a binder, press to form a sputtering target and then sputter to form the layer.

What is claimed is:

1. An improved electrochromic device of the type incorporating a cathodic electrochromic electrode in ionic contact with an ion conductor, the ion conductor being in ionic contact with a counterelectrode, the counterelectrode comprising a layer of an electronic conductor, wherein the improvement comprises: a layer of ruthenium oxide, the layer of ruthenium oxide being positioned between the layer of an electronic conductor and the ion conductor, the layer of ruthenium oxide being in ionic contact with the ion conductor, the layer of ruthenium oxide being in electronic contact with the layer of an electronic conductor, wherein the thickness of the layer of ruthenium oxide is in the range of from about 100 angstroms to about 1000 angstroms, the layer of ruthenium oxide and the electronic conductor not being an electrochromic electrode.

2. The electrochromic device of claim 1, wherein the layer of an electronic conductor is a layer of a metal.

3. The electrochromic device of claim 2, wherein the layer of a metal is a layer of gold.

4. The electrochromic device of claim 3, wherein the thickness of the layer of ruthenium oxide is in the range of from about 200 angstroms to about 600 angstroms.

5. The electrochromic device of claim 3, wherein the thickness of the layer of ruthenium oxide is about 400 angstroms.

6. The electrochromic device of claim 1, wherein the layer of an electronic conductor is a layer of indium tin oxide.

7. The electrochromic device of claim 1, wherein the thickness of the layer of ruthenium oxide is in the range of from about 200 angstroms to about 600 angstroms.

8. The electrochromic device of claim 1, wherein the ruthenium oxide layer is formed by sputtering from a target comprising ruthenium metal in a partial vacuum environment comprising oxygen gas.

9. The electrochromic device of claim 1, wherein the ruthenium oxide layer is formed by direct current sputtering from a target comprising rethenium oxide.

10. The electrochromic device of claim 1, wherein the ruthenium oxide layer is formed by repeated electrochemical oxidation and reduction of a layer of ruthenium metal.

* * * * *